(12) United States Patent
Long

(10) Patent No.: US 8,413,544 B2
(45) Date of Patent: Apr. 9, 2013

(54) MULTI-SPINDLE GEARBOX SYSTEM

(75) Inventor: Bo Long, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 76 days.

(21) Appl. No.: 12/957,617

(22) Filed: Dec. 1, 2010

(65) Prior Publication Data

US 2012/0067148 A1    Mar. 22, 2012

(30) Foreign Application Priority Data

Sep. 21, 2010    (CN) .......................... 2010 1 0289184

(51) Int. Cl.
*F16H 57/02*    (2012.01)
*B25J 15/00*    (2006.01)
(52) U.S. Cl. ...................... 74/606 R; 74/490.03; 901/28
(58) Field of Classification Search ................ 901/5, 11, 901/12, 14–29; 74/606 R, 490.01–490.08
See application file for complete search history.

(56) References Cited

U.S. PATENT DOCUMENTS

| | | | |
|---|---|---|---|
| 5,497,674 A * | 3/1996 | Inada | 74/490.03 |
| 6,634,851 B1 * | 10/2003 | Bonora et al. | 414/744.3 |
| 6,696,810 B2 * | 2/2004 | Uematsu et al. | 318/568.21 |
| 8,020,467 B2 * | 9/2011 | Haniya et al. | 74/490.02 |
| 2004/0001750 A1 * | 1/2004 | Kremerman | 414/744.1 |
| 2008/0258402 A1 * | 10/2008 | Tamura et al. | 277/345 |
| 2008/0264195 A1 * | 10/2008 | Larsson et al. | 74/490.02 |

* cited by examiner

*Primary Examiner* — James Pilkington
*Assistant Examiner* — Richard Urbanski
(74) *Attorney, Agent, or Firm* — Altis Law Group, Inc.

(57) ABSTRACT

A multi-spindle gearbox system includes a gearbox, a gear assembly, an output sleeve spindle, and a cable receiving barrel. The gearbox includes a base and a sealing cover covering the base. The sealing cover forms a hollow box space together with the base receiving the gear assembly therein. The base defines an assembly hole therethrough. The sealing cover defines a guiding hole corresponding to the assembly hole of the base. The output sleeve spindle is hollow and cylindrical with one end thereof assembled to the assembly hole of the base corresponding to the gear assembly. The cable receiving barrel is assembled within the gearbox. One end of the cable receiving barrel connects with the assembly hole and the other end of the cable receiving barrel passes through the guiding hole and is exposed to an outer side of the sealing cover.

5 Claims, 6 Drawing Sheets

MULTI-SPINDLE GEARBOX SYSTEM

BACKGROUND

1. Technical Field

The present disclosure relates to gearbox systems, and particularly, to a multi-spindle gearbox system applied to a mechanical robot.

2. Description of Related Art

Industrial robots are widely applied in many fields such as industrial manufacturing, repair, checking, and the like, to replace manual labor. When an industrial robot is deployed in a hazardous environment, the driving motor and the electric cable of the industrial robot are often directly exposed, risking power shutoff and damage. The driving motor and the electric cables of the industrial robot can erode over time and potentially cause accidents.

Therefore, there is a room for improved in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the multi-spindle gearbox system. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
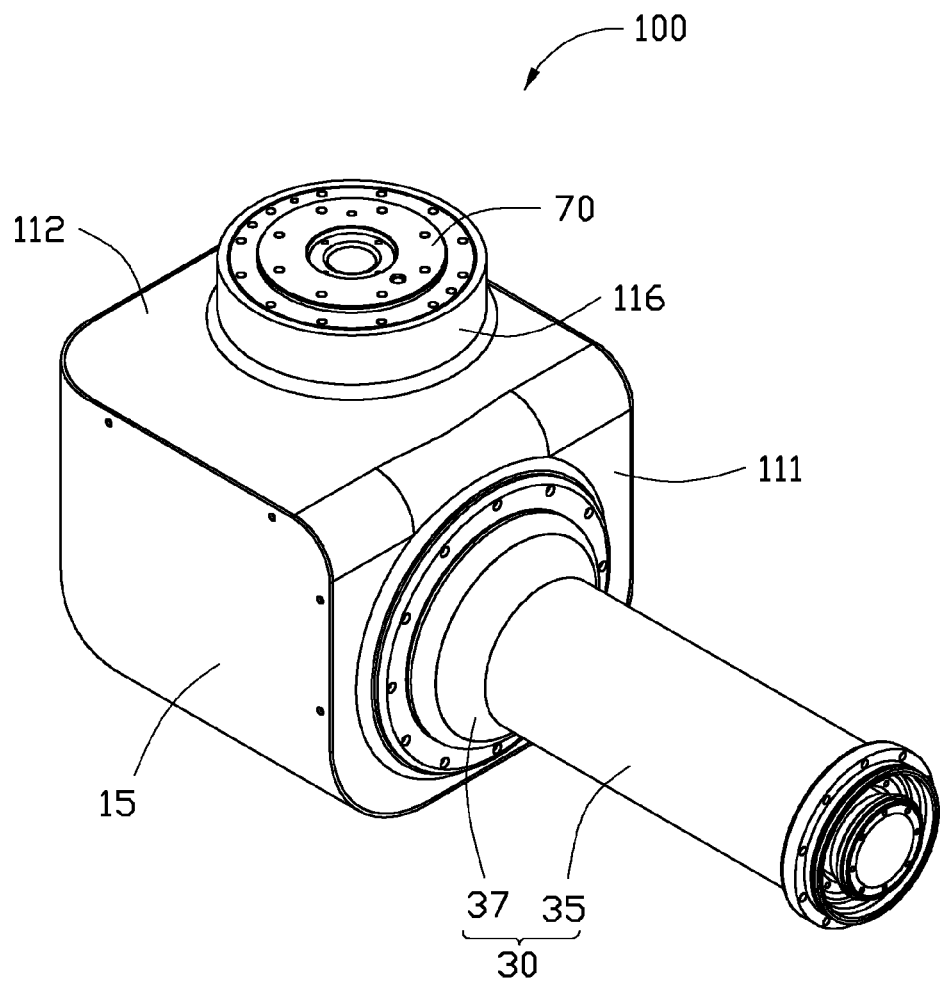
FIG. 1 is an assembled isometric view of an embodiment of a multi-spindle gearbox system.
Figure 2:
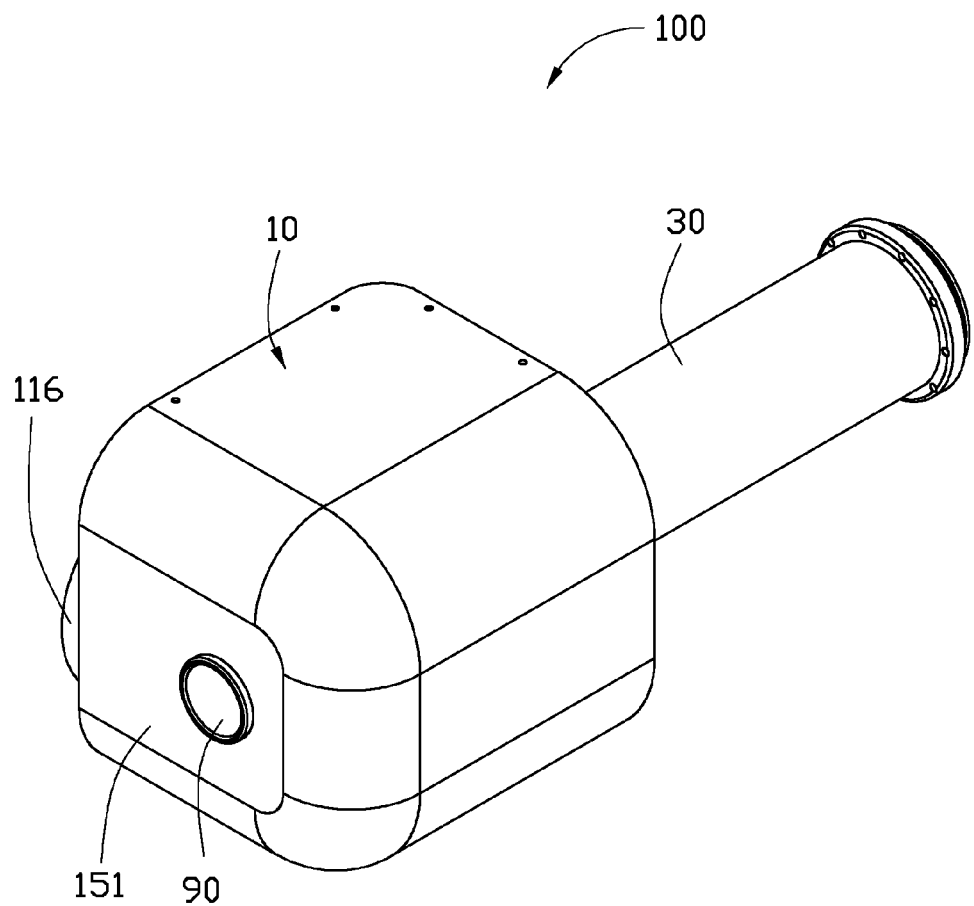
FIG. 2 is similar to FIG. 1, but viewed from another aspect.
Figure 3:
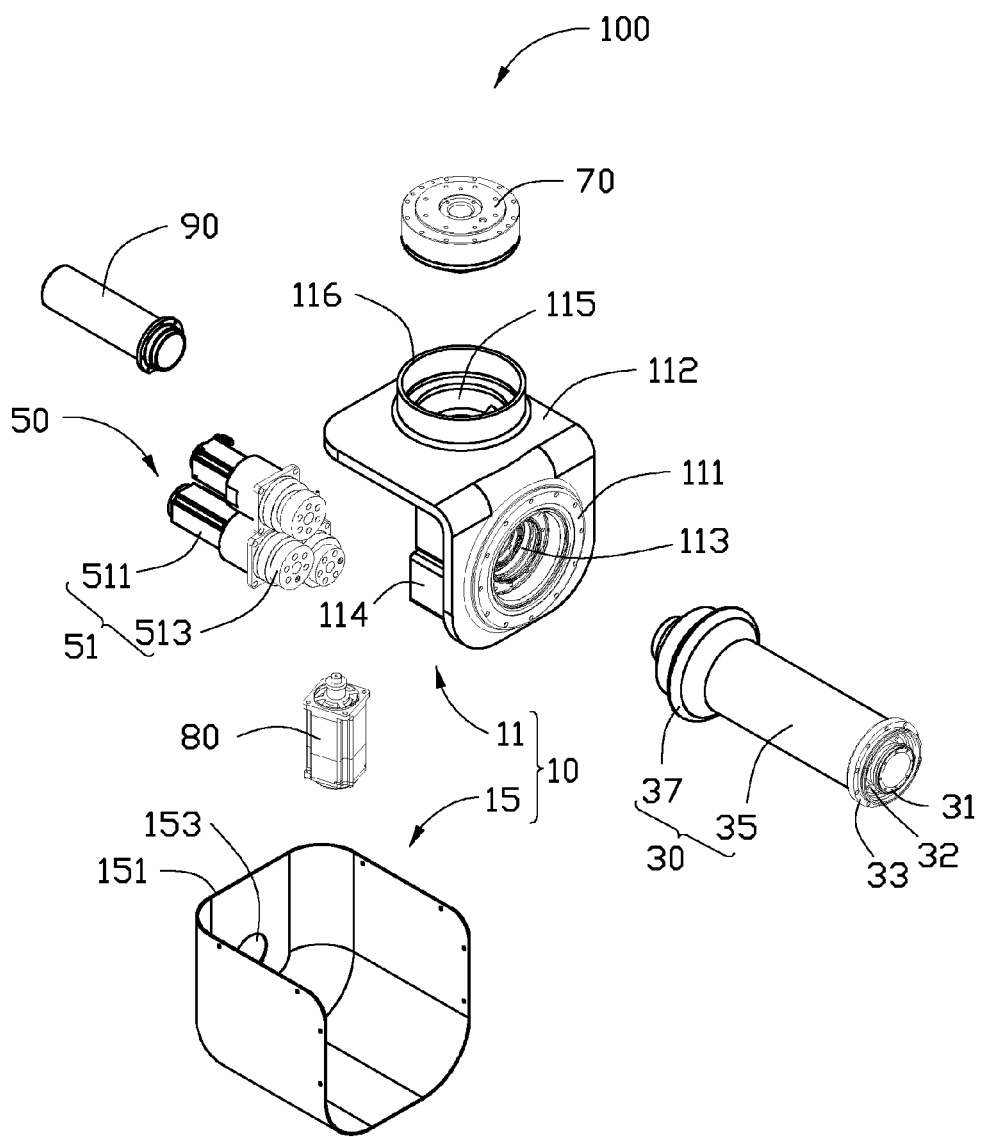
FIG. 3 is an exploded isometric view of the multi-spindle gearbox system shown in FIG. 1.
Figure 4:
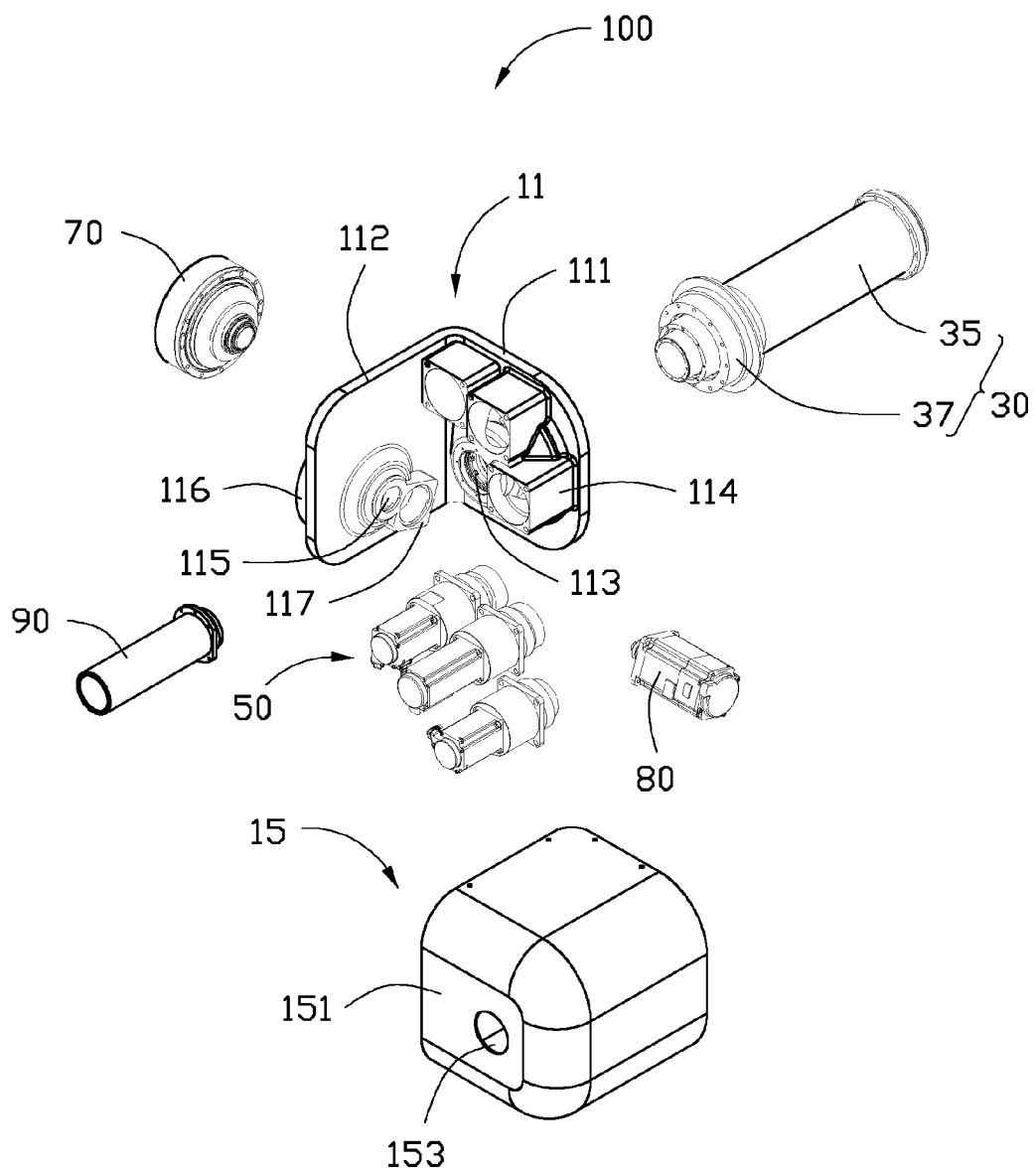
FIG. 4 is similar to FIG. 3, but viewed from another aspect.

Referring to FIGS. 1 through 5, an embodiment of a multi-spindle gearbox system 100 includes a gearbox 10, an output sleeve spindle 30, a gear assembly 40, a driving assembly 50, a connecting piece 70, a drive 80, and a cable-receiving barrel 90. The gearbox 10 includes a base 11 and a sealing cover 15 covering the base 11. The sealing cover 15 and the base 11 cooperatively form a hollow box space (not labeled) receiving the driving assembly 50, the drive 80 and the cable-receiving barrel 90 therein The base 11 is substantially L-shaped, having a first sidewall 111 and a second sidewall 112 substantially perpendicular to the first sidewall 111. The first sidewall 111 defines an assembly hole 113 therethrough corresponding to the output sleeve spindle 30. In the illustrated embodiment, the assembly hole 113 is a stepped hole with an aperture decreasing inwardly from an outer surface toward the opposite inner surface of the first sidewall 111, thereby forming a stepped inner wall (not labeled). At least one assembly portion 114 is formed on the inner surface of the first sidewall 111 and is positioned adjacent to the assembly hole 113. In the illustrated embodiment, three hollow columnar assembly portions 114 are formed on the inner surface of the first sidewall 111 and positioned surrounding the assembly hole 113. A mounting hole 115 is defined through the second sidewall 112. A hollow cylindrical receiving wall 116 is formed on the outer surface of the second sidewall 112 and positioned surrounding the corresponding mounting hole 115. A mounting portion 117 is formed on the inner surface of the second sidewall 112 and positioned surrounding the mounting hole 115.

The sealing cover 15 detachably covers the base 11 thereby forming the hollow box space therein together. The sealing cover 15 includes an end wall 151 corresponding to the first sidewall 111 of the base 11. As the sealing cover 15 is mounted onto the base 11, the end wall 151 is located opposite to the first sidewall 111 of the base 11. A guiding hole 153 is defined through the end wall 151 corresponding to the assembly hole 113 of the base 11. In the illustrated embodiment, as the sealing cover 15 is assembled to the base 11, the guiding hole 153 is coaxial with the corresponding assembly hole 113 of the first sidewall 111.

Figure 5:
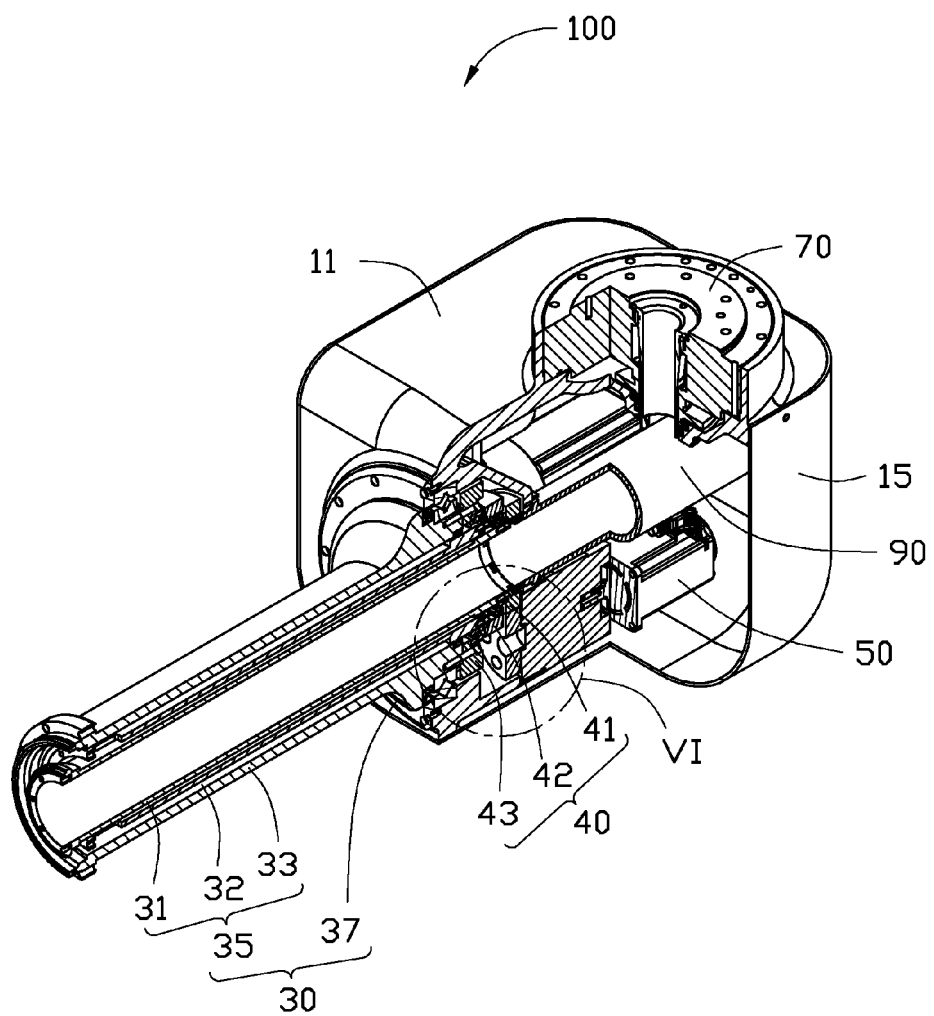
FIG. 5 is a cutaway view of the multi-spindle gearbox system of FIG. 1.
Figure 6:
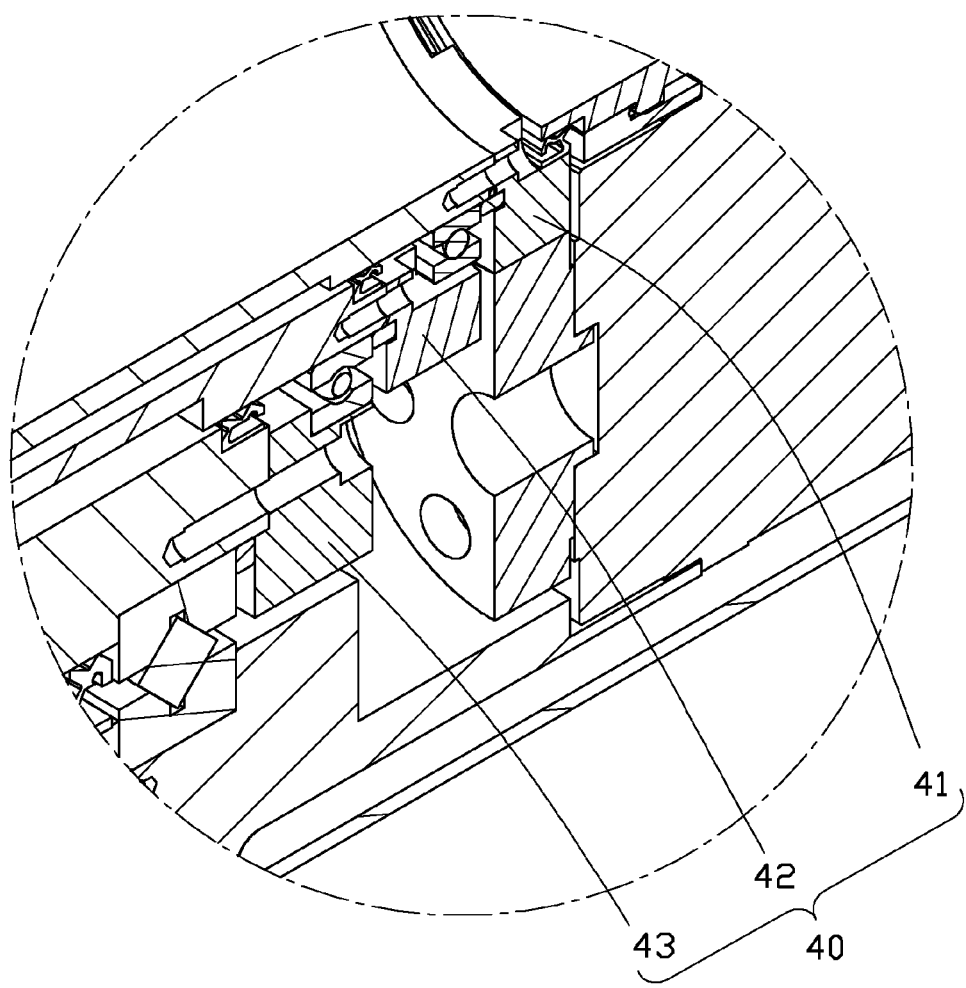
FIG. 6 is an enlarged view of circled portion VI of FIG. 5.

Referring to FIG. 5, the output sleeve spindle 30 is substantially hollow and cylindrical, with one end thereof rotatably assembled to the assembly hole 113 of the base 11 via the corresponding gear assembly 40. In the illustrated embodiment, the output sleeve spindle 30 includes a spindle body 35 and a connecting shaft 37 formed at a distal end of the spindle body 35. The spindle body 35 includes a hollow first output shaft 31, a hollow second output shaft 32, and a hollow third output shaft 33. The inner diameter of the second output shaft 32 exceeds that of the first output shaft 31, but is less than the inner diameter of the third output shaft 33, such that the first output shaft 31, the second output shaft 32, and the third output shaft 33 are sleeved together, and the second output shaft 32 is sandwiched between the first output shaft 31 and the third output shaft 33. An end of the first output shaft 31, an end of the second output shaft 32, and an end of the third output shaft 33 cooperatively form the connecting shaft 37. The connecting shaft 37 is a substantially stepped hollow shaft with the diameter thereof decreasing away from the spindle body 35 corresponding to the inner diameter of the assembly hole 113 of the base 11.

The gear assembly 40 is received within the assembly hole 113 of the base 11 and controlled by the driving assembly 50, to rotatably assemble the output sleeve spindle 30 to the base 11 of the gearbox 10. In the illustrated embodiment, the gear assembly 40 includes a first gear 41, a second gear 42 and a third gear 43. The first gear 41, the second gear 42 and the third gear 43 are respectively fixedly assembled to the corresponding first output shaft 31, the second output shaft 32 and the third output shaft 33. The first gear 41 is coaxially fixed to the end of the first output shaft 31 on the connecting shaft 37, and rotatably sleeved on the cable-receiving barrel 90. The second gear 42 is coaxially fixed to the end of the second output shaft 32 on the connecting shaft 37, and rotatably sleeved on the first output shaft 31. The third gear 43 is coaxially fixed to the end of the third output shaft 33 on the connecting shaft 37, and rotatably sleeved on the second output shaft 32.

The driving assembly 50 is mounted to the assembly portion 114 of the base 11 of the gearbox 10 and engages with the corresponding gear assembly 40, such that the gear assembly 40 can be rotated as the driving assembly 50 is operated. The driving assembly 50 includes three driving modules 51 respectively assembled to the corresponding three assembly portions 114 of the gearbox 10, rotating the first, second, and third gears 41, 42, 43 of the gear assembly 40. Each driving module 51 includes a driving motor 511, a reducer 513, and a plurality of electric cables (not shown). The reducer 513 is assembled to the assembly portion 114 and connects with the gear assembly 40. Each assembly portion 114 defines a hole (not labeled) communicating with the assembly hole 113. Each reducer 513 includes a gear (not labeled) received in the hole of the assembly portion 114. The gear of the reducer 513 engages with the corresponding first, second, or third gears 41, 42, 43 of the gear assembly 40. The driving motor 511 electrically connects with the reducer 513 and is connected to the outer electric source via the plurality of electric cables. One end of the electric cables is connected to the driving motors 511, the opposite other end of the electric cables are exposed to the outside of the gearbox 10 by passing through the mounting hole 115 and a middle hole of the connecting piece 70.

The connecting piece 70 is assembled to the mounting hole 115 of the base 11 and surrounded within the receiving wall 116. The connecting piece 70 connects with other devices. In the illustrated embodiment, the connecting piece 70 is a connecting shaft rotatably assembled within the mounting hole 115 and controlled by the drive 80. The drive 80 is assembled to the mounting portion 117 and connected to the connecting piece 70.

The cable-receiving barrel 90 is substantially hollow and cylindrical, and assembled within the gearbox 10 accommodating and guiding the electric cables out. One end of the cable-receiving barrel 90 is connected to the assembly hole 113 of the base 11 coaxially and fixed to the end of the connecting shaft 37 of the first output shaft 31, the opposite other end of the cable-receiving barrel 90 passes through the guiding hole 153 and is partially exposed to an outer side of the sealing cover 15, therefore, the cable-receiving barrel 90 and the first output shaft 31 are capable of accommodating and guiding a plurality of electric cables which are connected to an executing member (not shown) fixed to an end of the output sleeve spindle 30 opposite to the connecting shaft 37.

During assembly of the multi-spindle gearbox system 100, the gear assembly 40 is assembled into the assembly hole 113 of the base 11, and the connecting shaft 37 of the output sleeve spindle 30 is received in the assembly hole of the base 11 and rotatably assembled to the base 11 via the gear assembly 40. The driving assembly 50 is fixed to the assembly portion 114 of the base 11 and connected to the corresponding gear assembly 40 rotating the gear assembly 40. The connecting piece 70 is then assembled to the mounting hole 115 of the base 11 and received within the receiving space formed by the receiving wall 116 together with the mounting hole 115. The drive 80 is assembled to the mounting portion 117 and connects with the connecting piece 70. One end of the cable-receiving barrel 90 aligns with and is connected to the assembly hole 113 of the base 11 coaxially receiving and guiding the electric cables which are connected to the executing member out. The sealing cover 15 covers the base 11 with the opposite other end of the cable-receiving barrel 90 passing through the guiding hole 153 and partially exposed to the outer side of the sealing cover 15, to finish the assembly of the multi-spindle gearbox system 100.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A multi-spindle gearbox system, comprising:
    a gearbox comprising:
        a base comprising a first sidewall and a second sidewall substantially perpendicular to the first sidewall, the first sidewall defining an assembly hole therethrough, the assembly hole being a stepped hole with an aperture decreasing inwardly from an outer surface of the first sidewall toward an inner surface of the first sidewall, thereby forming a stepped inner wall; and
        a sealing cover detachably covering the base and forming a hollow box space together with the base, the sealing cover comprising an end wall positioned opposite to the first sidewall of the base, the end wall defining a guiding hole therethrough coaxially with the assembly hole of the base,
    a hollow output sleeve spindle comprising a spindle body and a connecting shaft formed at one distal end of the spindle body, the connecting shaft being rotatably assembled to the assembly hole of the base, wherein the connecting shaft is a stepped hollow shaft with a diameter thereof decreasing away from the spindle body corresponding to an inner diameter of the assembly hole of the base, the spindle body comprises a hollow first output shaft, a hollow second output shaft and a hollow third output shaft; the first output shaft, the second output shaft, and the third output shaft are sleeved on together, the second output shaft is sandwiched between the first output shaft and the third output shaft;
    a gear assembly received within the assembly hole of the base to rotatably assemble the output sleeve spindle to the base of the gearbox, wherein the gear assembly comprises a first gear, a second gear, and a third gear respectively rotatably assembled to the corresponding first output shaft, the second output shaft, and the third output shaft; and
    a cable-receiving barrel assembled within the gearbox with a first end fixed to the assembly hole and an opposite second end exposed to the outer side of the gearbox by passing through the guiding hole of the sealing cover.

2. The multi-spindle gearbox system of claim 1, wherein at least one assembly portion is formed on the inner surface of the first sidewall and positioned adjacent to the assembly hole, the multi-spindle gearbox system further comprises a driving assembly mounted to the at least one assembly portion of the base and engaging with a corresponding gear of the gear assembly, respectively rotating the corresponding gear of the gear assembly to rotate.

3. The multi-spindle gearbox system of claim 2, wherein the driving assembly comprises at least one driving module, the at least one driving module comprises a driving motor and a reducer, the reducer is assembled to a corresponding assembly portion and connected with the gear assembly, and the driving motor electrically connected with the reducer.

4. The multi-spindle gearbox system of claim 1, wherein the second side wall defines a mounting hole and includes a hollow cylindrical receiving wall formed on the outer surface thereof and positioned surrounding the corresponding mounting hole; the multi-spindle gearbox system further comprises a connecting piece assembled to the mounting hole and received within the hollow cylindrical receiving wall.

5. The multi-spindle gearbox system of claim 4, wherein the second side wall further comprises a mounting portion formed on the inner surface thereof and positioned adjacent to the mounting hole; the multi-spindle gearbox system further comprises a drive assembled to the mounting portion and connected to the connecting piece.

* * * * *